(12) United States Patent
Hsieh et al.

(10) Patent No.: US 7,416,599 B2
(45) Date of Patent: Aug. 26, 2008

(54) SYSTEM FOR BONDING GLASS INTO A STRUCTURE

(75) Inventors: Harry W. Hsieh, Troy, MI (US); Daniel P. Heberer, Rochester Hills, MI (US); Dominic J. Allam, Canton, MI (US); Ziyan Wu, Farmington Hills, MI (US)

(73) Assignee: Dow Global Technologies Inc., Midland, MI (US)

( * ) Notice: Subject to any disclaimer, the term of this patent is extended or adjusted under 35 U.S.C. 154(b) by 595 days.

(21) Appl. No.: 11/008,426

(22) Filed: Dec. 10, 2004

(65) Prior Publication Data

US 2005/0126683 A1    Jun. 16, 2005

Related U.S. Application Data

(63) Continuation-in-part of application No. 10/732,599, filed on Dec. 10, 2003, now abandoned.

(51) Int. Cl.
  *E06B 3/56* (2006.01)
  *C09J 5/02* (2006.01)
  *C09J 175/00* (2006.01)

(52) U.S. Cl. .................. 106/287.11; 524/188; 156/108; 156/314; 156/315; 156/331.4

(58) Field of Classification Search ............ 106/287.11; 156/108, 314, 315, 331.4; 524/188
See application file for complete search history.

(56) References Cited

U.S. PATENT DOCUMENTS

| | | | |
|---|---|---|---|
| 3,152,162 A | 10/1964 | Fischer et al. | |
| 3,459,584 A | 8/1969 | Caldwell | |
| 3,502,704 A | 3/1970 | McKellar | |
| 3,627,722 A | 12/1971 | Seiter | |
| 3,707,521 A | 12/1972 | De Santis | |
| 3,779,794 A | 12/1973 | De Santis | |
| 3,864,135 A | 2/1975 | Kuehn | |
| 3,886,226 A | 5/1975 | Asai et al. | |
| 3,971,751 A | 7/1976 | Isayama et al. | |
| 3,979,344 A | 9/1976 | Bryant et al. | |
| 4,020,049 A | 4/1977 | Rinehart | |
| 4,222,925 A | 9/1980 | Bryant et al. | |
| 4,224,376 A | 9/1980 | Ishige et al. | |
| 4,284,751 A | 8/1981 | Hutt et al. | |
| 4,302,571 A | 11/1981 | Arai et al. | |
| 4,345,053 A | 8/1982 | Rizk et al. | |
| 4,367,313 A | 1/1983 | Rizk et al. | |
| 4,374,237 A | 2/1983 | Berger et al. | |
| 4,396,681 A | 8/1983 | Rizk et al. | |
| 4,399,261 A | 8/1983 | Kato et al. | |
| 4,418,188 A | 11/1983 | Smith et al. | |
| 4,419,513 A | 12/1983 | Breidenbach et al. | |
| 4,444,974 A | 4/1984 | Takase et al. | |
| 4,474,933 A | 10/1984 | Huber et al. | |
| 4,507,469 A | 3/1985 | Mita et al. | |
| 4,511,626 A | 4/1985 | Schumacher | |
| 4,525,511 A | 6/1985 | Kirby et al. | |
| 4,539,345 A | 9/1985 | Hansen | |
| 4,555,561 A | 11/1985 | Sugimori et al. | |
| 4,567,228 A | 1/1986 | Gaa et al. | |
| 4,571,278 A | 2/1986 | Kunert | |
| 4,582,873 A | 4/1986 | Gaa et al. | |
| 4,618,656 A | 10/1986 | Kawakubo et al. | |
| 4,622,369 A | 11/1986 | Chang et al. | |
| 4,623,738 A | 11/1986 | Sugerman et al. | |
| 4,625,012 A | 11/1986 | Rizk et al. | |
| 4,640,969 A | 2/1987 | Goel et al. | |
| 4,643,794 A | 2/1987 | Saracsan et al. | |
| 4,645,816 A | 2/1987 | Pohl et al. | |
| 4,650,835 A | 3/1987 | Eck et al. | |
| 4,681,926 A | 7/1987 | Goel | |
| 4,687,533 A | 8/1987 | Rizk et al. | |
| 4,720,536 A | 1/1988 | House et al. | |
| 4,758,648 A | 7/1988 | Rizk et al. | |

(Continued)

FOREIGN PATENT DOCUMENTS

EP    0158893    10/1985

(Continued)

OTHER PUBLICATIONS

Fomrez (R) Tin Catalysts, Using Silane Crosslinked Technology, Witco Corp., Greenwich, CT (No Date Avail.).*
What is Kaneka MS Polymer and Kaneka Silyl?; Kaneka Corporation, Tokyo 107, Japan, pp. 1-15.
Dover Chemical Corporation, Doverphos 7, 12, 675, Tetrakis Isodecyl 4,4'Isopropylidene Diphosphite, Dover Ohio, No Date Available.
Derwent 92-425079/52, DE4119484-A, Teroson GmbH, Proebster, no date provided.
Derwent 94-279700, WO 9418255, Essex Specialty, Buchholz et al., no date provided.
Derwent 95-041548/06, JP 06322351-A, Sekisui Chem. Ind. Co. Ltd., no date provided.
Derwent 98-551255/47, JP 10245482-A, Konishi Co. Ltd., no date provided.

(Continued)

*Primary Examiner*—David M Brunsman
(74) *Attorney, Agent, or Firm*—Norman L Sims

(57) ABSTRACT

The invention is a composition comprising a) one or more organotitanates having four ligands wherein the ligands are hydrocarbyl, optionally containing one or more functional groups having one or more heteroatoms selected from the group comprising oxygen, nitrogen, phosphorus and sulfur wherein two or more of the ligands may form a cyclic structure; b) one or more mercaptosilanes; c) one or more polyaminosilanes; d) one or more secondary aminosilanes; and e) a solvent which dissolves the components of the composition. This composition is referred to as a clear primer hereinafter. In another embodiment the invention is a system for bonding glass to a substrate which comprises a clear primer according to the invention; and an adhesive comprising an isocyanate functional prepolymer and a catalyst for the cure of the isocyanate functional prepolymer.

21 Claims, No Drawings

U.S. PATENT DOCUMENTS

| | | |
|---|---|---|
| 4,780,520 A | 10/1988 | Rizk et al. |
| 4,788,170 A | 11/1988 | Wengrovius |
| 4,788,254 A | 11/1988 | Kawakubo et al. |
| 4,837,274 A | 6/1989 | Kawakubo et al. |
| 4,837,401 A | 6/1989 | Hirose et al. |
| 4,889,903 A | 12/1989 | Baghdachi |
| 4,906,707 A | 3/1990 | Yukimoto et al. |
| 4,954,598 A | 9/1990 | Baghdachi et al. |
| 4,963,614 A | 10/1990 | Ito et al. |
| 4,963,636 A | 10/1990 | Mülhaupt et al. |
| 4,965,311 A | 10/1990 | Hirose et al. |
| 4,977,228 A | 12/1990 | Wakabayashi et al. |
| 5,011,900 A | 4/1991 | Yukimoto et al. |
| 5,063,269 A | 11/1991 | Hung |
| 5,063,270 A | 11/1991 | Yukimoto et al. |
| 5,068,304 A | 11/1991 | Higuchi et al. |
| 5,086,151 A | 2/1992 | Ito et al. |
| 5,097,053 A | 3/1992 | Baghdachi et al. |
| 5,110,892 A | 5/1992 | Graham |
| 5,115,086 A | 5/1992 | Hsieh |
| 5,147,927 A | 9/1992 | Baghdachi et al. |
| 5,194,460 A | 3/1993 | Evans et al. |
| 5,206,200 A | 4/1993 | Bush et al. |
| 5,223,583 A | 6/1993 | Higuchi et al. |
| 5,223,597 A | 6/1993 | Iwakiri et al. |
| 5,272,224 A | 12/1993 | Baghdachi et al. |
| 5,288,839 A | 2/1994 | Greco |
| 5,302,303 A | 4/1994 | Clatty et al. |
| 5,330,597 A | 7/1994 | Leuchten et al. |
| 5,342,867 A | 8/1994 | Ryan et al. |
| 5,342,914 A | 8/1994 | Iwakiri et al. |
| 5,363,944 A | 11/1994 | Thiel et al. |
| 5,370,905 A | 12/1994 | Varga et al. |
| 5,403,881 A | 4/1995 | Okawa et al. |
| 5,409,961 A | 4/1995 | Green |
| 5,409,995 A | 4/1995 | Iwahara et al. |
| 5,476,889 A | 12/1995 | Owen |
| 5,489,618 A | 2/1996 | Gerkin |
| 5,500,464 A | 3/1996 | Homma et al. |
| 5,539,045 A | 7/1996 | Potts et al. |
| 5,541,266 A | 7/1996 | Hasegawa et al. |
| 5,554,686 A | 9/1996 | Frisch et al. |
| 5,554,709 A | 9/1996 | Emmerling et al. |
| 5,567,833 A | 10/1996 | Iwahara et al. |
| 5,603,798 A | 2/1997 | Bhat |
| 5,623,044 A | 4/1997 | Chiao |
| 5,650,467 A | 7/1997 | Suzuki |
| 5,672,652 A | 9/1997 | Bhat |
| 5,741,383 A | 4/1998 | Kneisel |
| 5,743,951 A * | 4/1998 | Ozai et al. .............. 106/287.11 |
| 5,744,543 A | 4/1998 | Huver et al. |
| 5,852,137 A | 12/1998 | Hsieh et al. |
| 5,910,555 A | 6/1999 | Ueda et al. |
| 5,922,809 A | 7/1999 | Bhat et al. |
| 5,952,052 A | 9/1999 | Hattori et al. |
| 5,976,305 A | 11/1999 | Bhat et al. |
| 6,025,416 A | 2/2000 | Proebster et al. |
| 6,255,434 B1 | 7/2001 | McGraw et al. |
| 6,319,344 B1 | 11/2001 | Lewno |
| 6,511,752 B1 | 1/2003 | Yao et al. |
| 6,512,033 B1 | 1/2003 | Wu |
| 6,649,016 B2 | 11/2003 | Wu et al. |
| 6,984,262 B2 * | 1/2006 | King et al. .............. 106/287.22 |
| 7,001,666 B2 * | 2/2006 | Krienke et al. .............. 428/429 |
| 2003/0232152 A1 | 12/2003 | Allam et al. |
| 2006/0124225 A1 | 6/2006 | Wu et al. |

FOREIGN PATENT DOCUMENTS

| | | |
|---|---|---|
| EP | 0082528 | 4/1986 |
| EP | 0070475 | 10/1986 |
| EP | 0363006 | 4/1990 |
| EP | 0546310 A2 | 6/1993 |
| EP | 0450105 | 11/1995 |
| EP | 0532048 B1 * | 8/1996 |
| EP | 0819749 A2 | 1/1998 |
| EP | 0532048 | 8/1998 |
| EP | 0533275 B1 | 12/1998 |
| EP | 0538880 | 3/1999 |
| EP | 0525769 | 9/1999 |
| EP | 0856569 B1 | 6/2002 |
| WO | WO98/18843 | 5/1998 |
| WO | WO99/55755 | 11/1999 |
| WO | WO99/55794 | 11/1999 |
| WO | WO03/19745 A1 | 3/2003 |
| WO | WO03/106579 A1 | 12/2003 |

OTHER PUBLICATIONS

Derwent 99-287967/24, WO9919405-A1, Kaneka Corporation, Yamaguchi et al., no date provided.

Derwent 99-210989/18, JP 11049970-A, Asahi Glass Co. Ltd., no date provided.

English Abstract, JP05043643A (Feb. 23, 1993) Granulating Agent for Rubber Powder, and Molding and Pavement Structure Prepared Therefrom, Susumu Takahashi et al.

English Abstract, JP05170857A (Jul. 9, 1993) Preparation of Urethane Prepolymer Excellent in Thermal Stability, Hiroshi Suzuki et al.

* cited by examiner

SYSTEM FOR BONDING GLASS INTO A STRUCTURE

This application is a continuation in part of Ser. No. 10/732,599, filed 10 Dec. 2003, now abandoned.

FIELD OF INVENTION

The invention relates to compositions used to prepare glass or plastic coated with an abrasion resistant coating for bonding to a polyurethane adhesive. In another embodiment, the invention relates to systems comprising a composition used to prepare glass or plastic coated with an abrasion resistant coating for bonding to polyurethane adhesives and the polyurethane adhesives. The invention further relates to a method of bonding glass or plastic coated with an abrasion resistant coating into a structure, such as a building or an automobile, using the system of the invention.

BACKGROUND OF INVENTION

Glass installation is typically a three-stage process. First, a clear silane primer is applied to the glass to clean and prepare the surface for bonding. Second, a primer, which is essentially a carbon black dispersion which also contains a compound having silane and/or isocyanate functionality, often referred to as "black-out primer", is then applied over the top of the clear primer. Third, an adhesive is applied to the primed glass which is then installed into the structure. See, U.S. Pat. No. 5,370,905, incorporated herein by reference. The black-out primer can mar surfaces of a structure or vehicle on to which the black-out primer may be dripped during installation. U.S. Pat. No. 5,363,944 discloses a single-step primer system. The primer comprises an aqueous primer solution containing a silane coupling agent which is used to facilitate adhesion of a polymer to a non-porous inorganic substrate such as metal or glass. The silane coupling agent has an amino or a mercapto functional group which is capable of reacting with functional groups of the polymer and also has one or more hydrolyzable groups which reacts with the free-hydroxyl groups on the surface of the substrate. This system requires long dry times before an adhesive can be applied. For many commercial operations, such long dry times are unacceptable. This is especially true in automotive assembly plants wherein each operation needs to be completed in a short period of time.

Yao et al. U.S. Pat. No. 6,511,752 discloses the method for adhering a polyurethane based adhesive to a substrate which comprises applying an aqueous primer solution onto the substrate which comprises water, an amino titanate compound, and preferably, an epoxy silane having at least one epoxy group and at least two alkoxy groups. Thereafter, a polyurethane adhesive is applied to the primer treated surface. A reaction product is formed of the primer and polyurethane.

In order for a primer and adhesive system to be commercially viable, that system must provide a durable bond. "Durable bond" means that the adhesive holds the window into the structure for a period of years. As the structure to which window glass or plastic coated with an abrasion resistant coating is traditionally bonded lasts for a significant number of years, it is expected that the bond holding the glass or coated plastic into a structure also lasts a significant number of years. What is needed is a system which bonds glass or coated plastic into a structure which does not require black-out primer, which provides durable adhesion and which does not require long dry times between application of the primer and application of the adhesive. What is further needed is a system which allows for durable adhesion of the adhesives to the substrate surface.

SUMMARY OF INVENTION

The invention is a composition comprising a) one or more organotitanates or organozirconates having four ligands wherein the ligands are hydrocarbyl, optionally containing one or more functional groups having one or more heteroatoms selected from the group comprising oxygen, nitrogen, phosphorus and sulfur wherein two or more of the ligands may form a cyclic structure; b) one or more mercaptosilanes; c) one or more polyaminosilanes; d) one or more secondary aminosilanes; and e) a solvent which dissolves the components of the composition. This composition is referred to as a clear primer hereinafter.

In another embodiment the invention is a system for bonding glass or a plastic coated with an abrasion resistant coating to a substrate which comprises a clear primer according to the invention; and an adhesive comprising an isocyanate functional prepolymer and a catalyst for the cure of the isocyanate functional prepolymer.

In another embodiment the invention is a method comprising

A) applying a clear primer according to the invention to the surface of a glass or an abrasion resistant coated plastic along the portion of the glass or coated plastic to be bonded into a structure;
B) applying a polyisocyante functional adhesive composition to the surface of the glass or coated plastic along the portion of the glass or coated plastic to be bonded into the structure to which the clear primer was previously applied; and
C) contacting the glass or coated plastic with the structure with the adhesive disposed between the glass or coated plastic and the structure.

The invention also comprises a structure having a window bonded to it using a clear primer of the invention and preferably a polyisocyanate functional adhesive composition. Preferably such structure is a building or an automobile. The invention provides a clear primer system and bonding system which bonds glass or plastic coated with an abrasion resistant coating into a structure without the need for a black-out primer. The system provides durable adhesion to the substrate. The clear primer dries rapidly allowing for application of the adhesive to the treated surface, in a short of period of time after the application of a clear primer. This system meets with the timing needs of an automobile assembly plant. The compositions and systems of the invention work well on a variety of frits (also referred to as ceramic enamels) deposited on glass or plastic coated with an abrasion resistant coating. In particular, they work on press bent and sag bent glass.

DETAILED DESCRIPTION OF INVENTION

In one aspect, the invention is a composition useful as a clear primer. This composition comprises one or more organotitanates or organozirconates, one or more mercaptosilanes, one or more polyaminosilanes and one or more secondary aminosilanes and a solvent which dissolves the components of the composition. One component of this composition is an organotitanate having four ligands wherein the ligands are hydrocarbyl, optionally containing one or more functional groups having one or more heteroatoms selected from the group comprising oxygen, nitrogen, phosphorus and sulfur. Any two or more of the ligands may be bonded together to form a cyclic ring structure. The cyclic ring structure can contain one or more heteroatoms or heteroatom containing functional groups. Any organotitanate having such ligands which enhances the formation of a durable adhesive bond between an isocyanate functional adhesive and a glass or coated plastic surface may be used. Preferably, the ligands on the titanate are hydrocarbyl, hydrocarbyl carboxyl, hydrocarbyl sulfonyl, hydrocarbyl amino, phosphatohydrocarbyl, pyrophosphatohydrocarbyl or a mixture thereof. Two or more ligands may form a hydrocarbylene moiety, or form a carbonyl containing hydrocarbylene moiety. In a more preferred embodiment, the ligands are alkyl, alkenyl, alkylcarboxyl, alkenyl carboxyl, aryl or aralkylsulfonyl, alkylamino, poly(alkylamino), phosphato-alkyl, pyrophosphato-alkyl, alkylene or carbonylalkylene or a mixture thereof. As used herein, "hydrocarbyl" means a monovalent moiety comprising hydrogen and carbon atoms. Hydrocarbylene means a polyvalent hydrogen and carbon containing moiety. The term "optionally containing heteroatom" means that the recited ligand may contain one or more heteroatoms such as nitrogen, sulfur, oxygen or phosphorus. "Alkenyl" means a straight or branched hydrocarbon chain having at least one double bond therein. "Alkyl" means a straight or branched saturated hydrocarbon chain. "Alkylene" means a straight or branched saturated polyvalent hydrocarbon chain. "Aryl" means an aromatic hydrocarbon containing ligand such as phenyl, biphenyl or naphthyl. "Alkaryl" means a ligand which comprises both aliphatic and aromatic structural components; for example, 1,3-propylene diphenyl or nonylphenyl. Arylene as used herein refers to a polyvalent group which comprises aromatic rings such as phenylene, naphthalene or biphenylene. Alkarylene means a polyvalent group which has both aliphatic and aromatic structural components; i.e., such as 1,3-propylene diphenylene or methylene diphenylene. Coated plastic as used herein means plastic coated with an abrasion resistant coating.

Preferably, the titanates and zirconates used in the invention correspond to Formula 1,

M─(─OR¹)₄ wherein $R^1$ comprises hydrocarbyl ligands, which may optionally contain one or more heteroatoms comprising oxygen, nitrogen, sulfur or phosphorus, with the proviso that two or more of $R^1$ may combine to form a cylic ring structure. Preferably, $R^1$ is independently in each occurrence alkylcarboxyl, alkenylcarboxyl, aryl or aralkylsulfonyl, alkylamino, polyalkylamino, phosphato-alkyl, pyrophosphato-alkyl or two or more of $R^1$ may combine to form an alklyene or carbonyl alkylene containing ring. In one preferred embodiment, $R^1$ comprises an alkylcarboyxl or alkenylcarboxyl moiety corresponding to the formula

wherein $R^2$ is an alkyl or alkenyl moiety.

In the embodiment wherein $R^1$ is alkyl, aryl or alkarylsulfonyl, $R^1$ preferably corresponds to the formula

wherein $R^3$ is alkyl, aryl or alkaryl.

In the embodiment, $R^1$ is alkylamino or poly(alkylamino), $R^1$ preferably corresponds to the formula

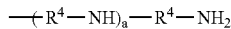

wherein $R^4$ is an alkylene group. Further, "a" is independently in each occurrence a rational number between about 0 and 3.

In the embodiment wherein $R^1$ is phosphate or pyrophosphato, $R^1$ preferably corresponds to the formula

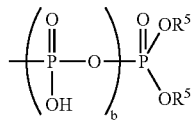

wherein $R^5$ is alkyl and b is 0 or 1.

In one preferred embodiment, at least one of $R^1$ is alkyl, more preferably $C_{1-8}$ alkyl, and most preferably isopropyl. Preferably, two or three of the ligands contain heteroatoms and most preferably three of the ligands contain heteroatoms. Preferably, $R^2$ is $C_{2-17}$ alkyl and more preferably $C_{3-8}$ alkyl. Preferably, $R^3$ is $C_{2-7}$ alkaryl and more preferably $C_{3-12}$ alkaryl. Preferably, $R^4$ is $C_{2-6}$ alkylene, more preferably $C_{2-4}$ alkylene and most preferably $C_{2-3}$ alkylene. Preferably, $R^5$ is $C_{2-17}$ alkyl, more preferably $C_{2-8}$ alkyl and most preferably octyl. Preferably a is a rational number of about 0 to about 3 and more preferably about 1 to about 2.

Among preferred titanate compounds are isopropyl triisostearoyl titanate available under the code KR-TTS from Kenrich Chemicals, isopropyltri(dodecyl)benzene sulfonyl titanate available from Kenrich Chemicals under the designation KR-9S, isopropyl tri (n-ethylenediamino)ethyl titanate available from Kenrich Chemicals under the designation KR-44, octylene glycol titanate, (tetrakis) 2-ethylhexane-1,3-(diolato) titanate available from E.I. DuPont Nemours under the trademark TYZOR OGT™, and 2-ethylhexyl titanate available from E.I. DuPont Nemours, under the trademark TYZOR TOT™.

The titanate is present in the clear primer composition in sufficient amount to enhance the durability of the bond between the isocyanate functional adhesive and the glass. Preferably, the titanate is present in the clear primer composition including the solvent in an amount of about 0 weight percent based on the total weight of the composition or greater, more preferably about 0.08 weight percent or greater and most preferably about 0.10 weight percent or greater. Preferably, the titanate is present in amount of about 50 weight percent or less based on the weight of the clear primer composition, more preferably about 45 weight percent or less and most preferably about 31 weight percent or less. Preferably, the titanate is present in the clear primer composition excluding the solvent, solids only, in an amount of about 0 weight percent based on the total weight of the solids of the composition or greater, more preferably about 1 weight percent or greater, more preferably about 17 weight percent or greater and most preferably about 34 weight percent or greater. Preferably, the titanate is present in the solids in an amount of about 83 weight percent or less based on the weight of the composition, more preferably about 64 weight percent or less and most preferably about 44 weight percent or less.

In order to facilitate a durable bond between the isocyanate functional adhesive and the glass or coated plastic surface, a mixture of at least three different silane compounds are utilized. Those silane compounds are one or more mercaptosilanes, one or more polyamino silanes and one or more secondary aminosilanes. "Mercaptosilanes" as used herein refer to any molecule having both a mercapto and a silane group which enhances the adhesion of an isocyanate functional adhesive to a glass or coated plastic surface. Preferably, mercaptosilanes are mercapto alkyl di or tri-alkoxy silanes. Preferably, mercaptosilanes correspond to the following formula

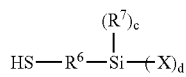

wherein $R^6$ is an hydrocarbylene group; X is a hydrolyzable group and $R^7$ is independently in each occurrence an alkyl group having 1 to 20 carbon atoms, an aryl group having 6 to 20 carbon atoms, an aralkyl group having 7 to 20 carbon atoms or a triorganosiloxy group represented by $(R')_3SiO—$, wherein each of the three R' groups, which may be the same or different represents a monovalent hydrocarbon group having 1 to 20 carbon atoms; X is independently in each occurrence a hydroxyl group or a hydrolyzable group; d is independently in each occurrence 0, 1, 2 or 3; and c is independently in each occurrence 0, 1 or 2. The sum of c and d is 3.

The hydrolyzable group represented by X is not particularly limited and is selected from conventional hydrolyzable groups. Specific examples are a hydrogen atom, a halogen atom, an alkoxy group, an acyloxy group, a ketoxime group, an amino group, an amido group, an acid amido group, an amino-oxy group, a mercapto group, and an alkenyloxy group. Preferred among them are a hydrogen atom, an alkoxy group, an acyloxy group, a ketoxime group, an amino group, an amido group, an amino-oxy group, a mercapto group, and an alkenyloxy group. An alkoxy group is more preferred with a methoxy or ethoxy group being most preferred, for ease in handling due to its mild hydrolyzability. Where two or more hydroxyl groups or hydrolyzable groups are present per reactive silicon group, they may be the same or different. $R^7$ is preferably an alkyl group, e.g., methyl or ethyl; a cycloalkyl group, e.g., cyclohexyl; an aryl group, e.g., phenyl; an aralkyl group, e.g., benzyl; or a triorganosilyl group of formula $(R')_3Si—$ in which R' is methyl or phenyl. $R^7$ and R' are most preferably a methyl group. $R^6$ is preferably a an alkylene, arylene or alkarylene group and more preferably a $C_2$-$C_8$ alkylene group, even more preferably a $C_{2-4}$ alkylene group and most preferably $C_{2-3}$ alkylene group. Among preferred mercaptosilanes are mercapto propyl trimethoxysilane and mercapto propyl methyl dimethoxy silane.

Mercaptosilane is present in sufficient amount to enhance the bonding of the isocyanate functional adhesive to the substrate, or coated plastic and glass surface. Preferably, the amount of mercaptosilane present in the composition including solvent is about 0 percent by weight or more of the clear primer composition, more preferably about 0.03 percent by weight or more and most preferably about 0.07 percent by weight or more. Preferably, the amount of mercaptosilane present in the clear primer composition including solvent is about 59 percent by weight or less, more preferably about 46 percent by weight or less and most preferably about 34 percent by weight or less. Preferably, the mercaptosilane is present in the clear primer composition excluding the solvent, solids only, in an amount of about 0 weight percent or greater, more preferably about 1 weight percent or greater, even more preferably about 7 weight percent or greater and most preferably about 13 weight percent or greater. Preferably, the mercaptosilane is present in the clear primer composition in the absence of a solvent, solids only, in an amount of about 84 weight percent or less, more preferably about 66 weight percent or less and most preferably about 48 weight percent or less.

Polyamino silanes useful in the invention include any silane containing two or more primary and/or secondary amino groups, which polyamino silanes enhance the adhesion of the isocyanate functional material to a substrate surface wherein the adhesion is durable. Preferred polyamino silanes are amino alkyl substituted aminoalkyl trialkoxy silanes. Preferred polyamino silanes correspond to the formula

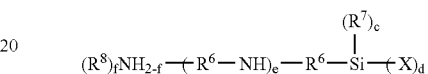

wherein $R^6$, $R^7$, X or c and d are as defined as hereinbefore; $R^8$ is independently in each occurrence an alkyl group; f is 0 or 1 and e is a rational number of about 1 to about 3, and more preferably about 1 to about 2. Among preferred polyamino silanes are N-2-aminoethyl-3-aminopropyl trimethoxy silane and N-aminoethyl-3'-aminopropylmethyldimethoxy silane. The polyamino silanes are present in sufficient amount to enhance the durability of the bond of the isocyanate functional adhesive to the substrate surface. Preferably, the polyamino silane is present in the clear primer composition, including solvent, in an amount of about 0 percent by weight or greater, more preferably about 0.1 percent by weight or greater and most preferably about 0.3 percent by weight or greater. Preferably, the polyamino silane is present in the clear primer composition in an amount of about 16 percent by weight or less, more preferably about 11 percent by weight or less and most preferably about 5 percent by weight or less. Preferably, the polyamino silane is present in the clear primer composition excluding the solvent, solids only, in an amount of about 0 weight percent or greater, more preferably about 1 weight percent or greater and most preferably about 3 weight percent or greater. Preferably, the polyamino silane is present in the clear primer composition solids only basis, in an amount of about 22 weight percent or less based on the weight of the composition, more preferably about 15 weight percent or less and most preferably about 7 weight percent or less.

The compositions of the invention further contain secondary amino silanes, which are compounds which contain one or more, more preferably one, secondary amino groups and one or more silane groups and which enhance the bond of the isocyanate adhesive to the substrate surface. Preferably, the secondary amino silanes do not contain primary amino groups. In one embodiment such secondary amino silanes preferably correspond to the following formula

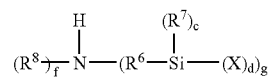

wherein $R^6$, $R^7$, $R^8$, X, c, d and f are as defined hereinbefore and g is 1 or 2 with the proviso that the sum of f and g must be 2. Preferably, $R^8$ is $C_{2-8}$ alkyl and most preferably $C_{1-3}$ alkyl.

In another embodiment the secondary aminosilanes are aminoalkyl alkylpolysiloxanes, for example, Dynasylan 1146 aminoalkyl alkyl polysiloxane. Among preferred secondary amino silanes are bis-(3-trimethoxysilylpropylamine), 3-ethylamino-2-methyl-propyltrimethoxy silane, 3-ethylamino-2-methylpropyldimethoxy(methyl) silane, N-methyl aminopropyl trimethoxy silane and Dynasylan 1146 aminoalkyl alkyl polysiloxane. The secondary amino silane is present in sufficient amount to enhance the durability of the isocyanate adhesive to the substrate. Preferably, the secondary amino silane is present in the clear primer composition, including solvents, in an amount of about 0 percent by weight or greater, more preferably about 0.01 percent by weight or greater and most preferably about 0.02 percent by weight or greater. Preferably, the secondary amino silane is present in the clear primer composition in an amount of about 16 percent by weight or less, more preferably about 9 percent by weight or less and most preferably about 3 percent by weight or less. Preferably, the secondary amino silane is present in the clear primer composition excluding the solvent, solids only, in an amount of about 0 weight percent or greater, more preferably about 1 weight percent or greater, even more preferably about 2 weight percent or greater and most preferably about 3 weight percent or greater. Preferably, the secondary amino silane is present in the clear primer, solids only, amount of about 22 weight percent or less based on the weight of the composition, more preferably about 13 weight percent or less and most preferably about 4 weight percent or less.

The ratio of the mercaptosilane to the polyamino silane to the secondary amino silane on a molar basis has an impact on the durability of the adhesive. Any molar ratio which gives a durable adhesive may be used. Preferably, the ratio is about 10:1:0.4 to about 1.0:1.0:1.0.

The clear primer composition of the invention further comprises a solvent. The solvents which are relatively inert towards the components of the composition and which volatilize rapidly after application of the composition to the surface of a substrate are preferably used. It is desirable that the solvent volatilize away from the surface of a substrate in sufficient time to allow application of the adhesive within the normal time constraints of assembly or fabrication under commercial conditions. For example, in the circumstances where a window is being installed in a vehicle on an assembly line, it is desirable that the solvent volatilize away before the application of adhesive and within the time period allotted for installation of the window into the vehicle without holding up the assembly line. Preferably, the substrate surface is dry before the adhesive is applied. Preferably, the solvent has volatilized away, in about 30 seconds or less, more preferably 20 seconds or less and most preferably 10 seconds or less. Preferable solvents include aromatic hydrocarbons, aliphatic hydrocarbons and low molecular weight alcohols and glycols. Low molecular weight alcohols and glycols preferably contain between about 1 and about 3 carbon atoms. Preferably, the aliphatic hydrocarbons have from about 4 to about 10 carbon atoms and more preferably from about 6 to about 9 carbon atoms and most preferably from about 7 to about 8 carbon atoms. Among preferred aliphatic hydrocarbons are hexane, 2,3-dimethylbutane, 2 methylbutane, 3-methylpentane, heptane, 2-methylhexane, 3-methylhexane, 2,3-dimethylpentane, 2,2-dimethylpentane, and 2,4-dimethylpentane. Preferably, the aromatic hydrocarbons contain about 6 to about 8 carbon atoms. Preferred aromatic hydrocarbons include toluene and xylene. Preferred alcohols and glycols useful include methanol, ethanol, n-propyl alcohol, isopropyl alcohol, n-butyl alcohol and isobutyl alcohol. Among preferred solvents are toluene, xylene and heptane. The solvent is present in sufficient amount to dissolve the components of the composition and not so much as to lengthen the drying time of the solvent after application to the substrate surface. Preferably, the solvent is present in an amount based on the total weight of the clear primer composition of about 0 weight percent or greater, more preferably about 45 weight percent or greater and most preferably about 60 weight percent or greater. Preferably, the solvent is present in an amount based on the total weight of the clear primer composition of about 99.5 percent by weight or less, more preferably about 95 percent by weight or less and most preferably about 90 percent by weight or less.

The clear primer may further contain a component that fluoresces when illuminated by ultraviolet light. Fluorescing components are readily available from numerous sources, for example Aldrich Chemical Co., Milwaukee, Wis. As a specific example, the fluorescing component can be Uvitex OB brand fluorescing agent available from Ciba Specialty Chemicals, Tarrytown, N.Y. (USA). The amount of fluorescing agent added to the primer must be sufficient so that the area of the window treated with the primer is apparent when the window is illuminated with an ultraviolet light.

As used herein, the term "durable bond" refers to the bond of the adhesive to the substrate surface wherein the bond lasts for a significant portion of the life, or the entire life, of the structure. The durability of a bond is typically predicted utilizing an accelerated aging test. For purposes of this invention, the following accelerated aging tests will be used as a predictor for durability of a bond. The clear primers are applied by saturating a cheesecloth with the solution and applying a thin wet coating to the window surface. Twenty seconds after the application, the adhesive is applied in a bead of 8.8 mm in width and 6.8 mm in thickness down the length of the substrate. The adhesive is allowed to cure for 7 days at 23° C. and 50 percent Relative Humidity, and then the sample is placed into a water bath and held at 90° C. After the indicated times the sample is removed from the water bath, allowed to rest at least 15 minutes, and then tested. The adhesive/substrate interface is scored with a sharp knife as the adhesive is being pulled back. The results are listed as the percent of cohesive failure (failure within the urethane adhesive) with the desired result being 100 percent CF (cohesive failure). The long-term durability is expressed as the number of days required to lose 100 percent CF. As used herein, a durable bond means that the adhesive under the above-mentioned test exhibits a performance of about 5 days or greater, more preferably about 6 days or greater and most preferably about 8 days or greater.

The system of the invention can utilize any isocyanate functional adhesive which is designed for bonding to nonporous surfaces such as metal, coated plastic and/or glass. Examples of useful adhesive systems are disclosed in U.S. Pat. No. 4,374,237, U.S. Pat. No. 4,687,533, U.S. Pat. No. 4,780,520, U.S. Pat. No. 5,063,269, U.S. Pat. No. 5,623,044, U.S. Pat. No. 5,603,798, U.S. Pat. No. 5,852,137, U.S. Pat. No. 5,976,305, U.S. Pat. No. 5,852,137, U.S. Pat. No. 6,512,033, relevant portions, incorporated herein by reference.

The polyisocyanate functional adhesives useful in the invention generally comprise a prepolymer having isocyanate functionality, a catalyst for the cure of the prepolymer and other additives well known to those skilled in the art. The prepolymers used in the invention can be conventional prepolymers used in polyurethane adhesive compositions. In a preferred embodiment the prepolymers are blended with a compound or polymer having silane functionality. In another preferred embodiment the prepolymer contains silane functionality as well as isocyanate functionality. A urethane prepolymer having silane functionality may be used as the entire prepolymer used in the adhesive or it may be blended with a prepolymer which does not have silane functionality.

Preferable urethane prepolymers for use in preparing the composition of the invention include any compound having an average isocyanate functionality of at least about 2.0 and a molecular weight of at least about 2,000. Preferably, the average isocyanate functionality of the prepolymer is at least about 2.2, and is more preferably at least about 2.4. Preferably the isocyanate functionality is no greater than about 4.0, more preferably no greater than about 3.5 and most preferably no greater than about 3.0. Preferably, the weight average molecular weight of the prepolymer is at least about 2,500, and is more preferably at least about 3,000; and is preferably no greater than about 40,000, even more preferably no greater than about 20,000, more preferably, no greater than about 15,000 and is most preferably no greater than about 10,000. The prepolymer may be prepared by any suitable method, such as by reacting an isocyanate-reactive compound containing at least two isocyanate-reactive groups with an excess over stoichiometry of a polyisocyanate under reaction conditions sufficient to form the corresponding prepolymer; see Hsieh et al., U.S. Pat. No. 5,852,137, column 4, line 65 to column 5, line 7, incorporated herein by reference. Suitable polyisocyanates for use in preparing the prepolymer are disclosed in Hsieh et al., U.S. Pat. No. 5,852,137 at column 2, line 40 to column 3, line 45, incorporated herein by reference. The isocyanate content in the prepolymers is preferably in the range of about 0.1 percent to about 10 percent, more preferably in the range of about 1.0 percent to about 5.0 percent and most preferably in the range of about 1.5 percent to about 3.0 percent.

The prepolymer is present in the adhesive composition in sufficient amount such that the adhesive is capable of bonding glass or coated plastic to the desired substrate such as metal, plastic, fiberglass or composites. Preferably the polyurethane prepolymer is present in an amount of about 20 percent by weight or greater based on the weight of the adhesive composition, more preferably about 30 percent by weight or greater and most preferably about 40 percent by weight or greater. Preferably the polyurethane prepolymer is present in an amount of about 99.8 percent by weight or less based on the weight of the adhesive composition, more preferably about 98 percent by weight or less and most preferably about 85 percent by weight or less.

In those embodiments where the adhesive is used to bond glass to substrates coated with acid resistant paints it is desirable to have a silane present in some form. Preferable methods of including silane functionality in the adhesive formulations are disclosed in Wu et al., U.S. Pat. No. 6,512,033 at column 5, line 38 to column 7, line 27; U.S. Pat. No. 5,623,044, U.S. Pat. No. 4,374,237; U.S. Pat. No. 4,345,053 and U.S. Pat. No. 4,625,012, relevant portions incorporated herein by reference. The amount of silane present is that amount which enhances the adhesion of the adhesive to the painted surface. The amount of silane present is preferably about 0.1 percent by weight or greater based on the weight of the adhesive and most preferably about 0.5 percent by weight or greater. The amount of silane used is preferably about 10 percent by weight or greater or less and most preferably about 2.0 percent by weight or less.

The adhesive also contains a catalyst which catalyzes the reaction of isocyanate moieties with water or an active hydrogen containing compound. Such compounds are well known in the art. The catalyst can be any catalyst known to the skilled artisan for the reaction of isocyanate moieties with water or active hydrogen containing compounds. Among preferred catalysts are organotin compounds, metal alkanoates, and tertiary amines, such as dimorpholinodialkyl ethers. Included in the useful catalysts are organotin compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. The dialkyltin dicarboxylate preferably corresponds to the formula $(R^9OC(O))_2$—Sn—$(R^9)_2$ wherein $R^9$ is independently in each occurrence a $C_{1-10}$ alkyl, preferably a $C_{1-3}$ alkyl and most preferably a methyl. Dialkyl tin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. The organo tin catalyst is present in an amount of about 60 parts per million or greater based on the weight of the adhesive, more preferably 120 parts by million or greater. The organo tin catalyst is present in an amount of about 1.0 percent or less based on the weight of the adhesive, more preferably 0.5 percent by weight or less and most preferably 0.1 percent by weight or less.

Other useful catalysts include tertiary amines such as, dimorpholinodialkyl ether, a di((dialkylmorpholino)alkyl) ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methylmorpholine, N-ethyl morpholine and mixtures thereof and a metal alkanoates, such as bismuth octoate or bismuth neodecanoate. A preferred dimorpholinodialkyl ether is dimorpholinodiethyl ether. A preferred di((dialkylmorpholino)alkyl)ether is (di-(2-(3,5-dimethylmorpholino) ethyl)ether). Tertiary amines, such as dimorpholinodialkyl ether or di((dialkylmorpholino)alkyl)ether, are preferably employed in an amount, based on the weight of the adhesive, of about 0.01 percent by weight or greater, more preferably about 0.05 percent by weight or greater, even more preferably about 0.1 percent by weight or greater and most preferably about 0.2 percent by weight or greater and about 2.0 percent by weight or less, more preferably about 1.75 percent by weight or less, even more preferably about 1.0 percent by weight or less and most preferably about 0.4 percent by weight or less.

The adhesive composition or clear primer may further comprises a stabilizing amount of an organophosphite. The organophosphite is preferably present in a sufficient amount to enhance the durability of bond of the adhesive composition to the substrate surface. Preferably at least one of the phosphorous atoms is bonded to an oxygen atom which is bonded to an aromatic moiety, such as a phenyl. Preferably at least one of the phosphorous atoms is bonded to an oxygen atom bonded to an alkyl moiety. Preferably at least one of the phosphorous atoms is bonded to both an aromatic moiety and an alkyl moiety through oxygen moieties. The organophosphites preferred for use in this invention are phosphites wherein the ligands on the phosphite comprise one ligand with at least one aliphatic moiety and one ligand with at least one aromatic moiety or comprises at least one ligand having both aromatic and aliphatic structure; i.e., alkaryl. Ligand as used herein refers to the groups bound to the oxygens bound to the phosphorous atoms of the phosphite. In a preferred embodiment the phosphite corresponds to the formulas

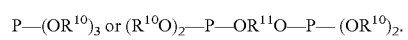

$$P-(OR^{10})_3 \text{ or } (R^{10}O)_2-P-OR^{11}O-P-(OR^{10})_2.$$

Preferably $R^{10}$ is independently in each occurrence $C_{6-18}$ alkyl, $C_{7-30}$ alkaryl or $C_{6-20}$ aryl; more preferably $C_{6-12}$ alkyl and most preferably $C_{9-12}$ alkyl. Preferably $R^{11}$ is independently in each occurrence $C_{6-18}$ alkylene, $C_{7-30}$ alkarylene; or $C_{6-20}$ arylene; more preferably $C_{7-30}$ alkarylene or $C_{6-20}$ arylene; even more preferably $C_{7-30}$ alkarylene and most preferably a divalent bisphenol structure for instance 1,3 propylene diphenyl or methylene diphenyl. Preferably the divalent bisphenol is based on bisphenol A or bisphenol F. As used herein alkyl means saturated straight or branched carbon chain.

Among preferred organophosphites are poly(dipropyleneglycol)phenyl phosphite (available from Dover Chemical Corporation under the trademark and designation DOVERPHOS 12), tetrakis isodecyl 4,4'isopropylidene diphosphite (available from Dover Chemical Corporation under the trademark and designation DOVERPHOS 675), and phenyl diisodecyl phosphite (available from Dover Chemical Corporation under the trademark and designation DOVERPHOS 7). Preferably the organophosphite is present in the adhesive or clear primer in an amount of about 0.1 percent by weight or greater and more preferably about 0.2 percent by weight or greater. Preferably the organophosphite is present in the adhesive or clear primer in an amount of about 1.0 percent by weight or less and more preferably about 0.5 percent by weight or less.

In a preferred embodiment, the adhesive, clear primer or both used in the invention include a light stabilizer. Any light stabilizer which facilitates the system maintaining durable bond to the substrate for a significant portion of the life of the structure to which it is bonded may be used. Preferred light stabilizers are hindered amine light stabilizers. Hindered amine light stabilizers generally comprise include those available from Ciba Geigy such as Tinuvin 144 n-butyl-(3,5-di-ter-butyl-4-hydroxybenzyl)bis-(1,2,2,6-pentamethyl-4-piperidinyl) malonate; Tinuvin 622 dimethyl succinate polymer with 4-hydroxy-2,2,6,6,-tetramethyl-1-piperidine ethanol; Tinuvin 77 bis(2,2,6,6,-tetramethyl-4-piperidinyl) sebacate; Tinuvin 1,2,3bis-(1-octyloxy-2,2,6,6, tetramethyl-4-piperidinyl) sebacate; Tinuvin 765 bis(1,2,2,6,6,-pentamethyl-4-piperidinyl) sebacate; Chimassorb 944 poly[[6-[1,1,3,3-tetramethylbutyl)amino ]-1,3,5-triazine-2,4-diyl][(2,2,6,6-tetramethyl-4-piperidinyl)imino]-1,6-hexanediyl[(2,2,6-tetramethyl-4-piperidinyl)imino]]) and available from Cytec, Cyasorb UV-500; 1,5-dioxaspiro(5,5)undecane 3,3-dicarboxylic acid, bis(2,2,6,6,-tetramethyl-4-piperidinyl)ester; Cyasorb UV-3581; 3-dodecyl-1-(2,2,6,6,-tetramethyl-4-piperidyl-pyrrolidin-2,5-dione) and Cyasorb UV-3346 Poly[(6-morpholino-s-triazine-2,4-diyl)[2,2,6,6-tetramethyl-4-piperidyl)imino]-hexamethylene [(2,2,6,6-tetramethyl-4-piperidyl)imino]]. More preferred hindered light amine stabilizers include Tinuvin 1,2,3bis-(1-octyloxy-2,2,6,6, tetramethyl-4-piperidinyl) sebacate and Tinuvin 765 bis(1,2,2,6,6,-pentamethyl-4-piperidinyl) sebacate. A sufficient amount of light stabilizer to enhance the bond durability to the substrate may be used. Preferably, the light stabilizer is used in amount of about 0.1 percent by weight or greater based on the weight of the adhesive or clear primer composition, more preferably 0.2 percent by weight or greater and most preferably about 0.3 percent by weight or greater. Preferably, the amount of light stabilizer present in the adhesive or clear primer is about 3 weight percent or less, more preferably about 2 weight percent or less and most preferably about 1 weight percent or less.

In another preferred embodiment, the adhesive composition, clear primer or both used in the invention further comprises an ultraviolet light absorber. Any ultraviolet absorber which enhances the durability of the bond of the adhesive to the substrate may be used. Preferred UV light absorbers include benzophenones and benzotriazoles. More preferred UV light absorbers include those from Ciba Geigy such as Tinuvin P; 2-(2'-hydroxy-5'-methylphenyl)-benzotriazole; Tinuvin 326 2-(5-chloro-2H-benzotriazol-2-yl)-6-(1,1-dimethylethyl)-4-methylphenol; Tinuvin 213 poly(oxy-1,2-ethanediyl), (α,(3-(3-(2H-benzotriazol-2-yl)-5-(1,1-dimethylethyl)-4-hydroxyphenyl)-1-oxopropyl)-ω-hydroxy; and poly(oxy-1,2-ethyanediyl), (α,(3-(3-(AH-benzotriazol-2-yl)-5-(1,1-dimethylethyl)-4-hydroxyphenyl) -1-oxopropyl)-ω-(α,(3-(3-(2H-benzotriazol-2-yl)-5-(1,1-dimethylethyl)-4-hydroxyphenyl) -1-oxopropyl); Tinuvin 327 2-(3,5-di-tert-butyl-2-hydroxyphenol)-5-chlorobenzotriazole; Tinuvin 571 2-(2H-benzotriazol-2-yl)-6-dodecyl-4-methylphenol, branched and linear; Tinuvin 328 2-(2H-benzotriazol-2-yl)-4,6-bis(1,1-dimethylpropyl)phenol and from Cytec such as Cyasorb UV-9; 2-Hydroxy-4-methoxybenzophenone; Cyasorb UV-24; 2,2'-dihydroxy-4-methoxybenzophenone; Cyasorb UV-1164; 2-[4,6-bis(2,4-dimethylphenyl)-1,3,5-triazin-2-yl]-5-(octyloxy)phenol; Cyasorb UV-2337; 2-(2'-hydroxy-3'-5'-di-t-amylphenyl) benzotriazole; Cyasorb UV-2908; 3,5-di-t-butyl-4-hydroxybenzoic acid, hexadecyl ester; and Cyasorb UV-5337; 2-(2'-hydroxy-3',5'-di-t-butylphenyl)-5-chlorobenzotriazole; Cyasorb UV-531; 2-hydroxy-4-n-octoxybenzophenone; and Cyasorb UV-3638; 2,2-(1,4-phenylene)bis[4H-3,1-benzoxazin-4-one]. More preferred UV light absorbers include Cyasorb UV-531; 2-hydroxy-4-n-octoxybenzophenone Tinuvin 571 and 2-(2H-benzotriazol-2-yl)-6-dodecyl-4-methylphenol, branched and linear.

Preferably, the UV light absorber is used in sufficient amount to enhance the durability of the bond of the adhesive to the substrate. Preferably, the UV inhibitor is used in an amount of about 0.1 percent by weight or greater based on the weight of the adhesive composition or clear primer, more preferably about 0.2 weight percent or greater and most preferably about 0.3 weight percent or greater. Preferably, the UV light inhibitor is used in amount of about 3 percent by weight or less based on the weight of the adhesive composition or clear primer, more preferably about 2 percent by weight or less and most preferably about 1 percent by weight or less.

For formulating adhesive compositions, the one or more prepolymers and the silane containing compound, if present, are combined, preferably with fillers and additives known in the prior art for use in elastomeric compositions. By the addition of such materials, physical properties such as viscosity, flow rate, sag, and the like can be modified. However, to prevent premature hydrolysis of the moisture sensitive groups of the polymer, the filler should be thoroughly dried before admixture therewith. Exemplary filler materials and additives include materials such as carbon black, titanium dioxide, clays, calcium carbonate, surface treated silicas, ultraviolet stabilizers, antioxidants, and the like. This list, however, is not comprehensive and is given merely as illustrative. The fillers are preferably present in an amount of about 15 percent by weight or greater based on the adhesive. The fillers are preferably present in an amount of about 70 percent by weight or less based on the adhesive, more preferably 60 percent by weight or less and even more preferably 50 percent by weight or less.

The adhesive composition also preferably contains one or more plasticizers or solvents to modify rheological properties to a desired consistency. Such materials are preferably free of water, inert to isocyanate groups, and compatible with the polymer. Such material may be added to the reaction mixtures for preparing the prepolymer, or to the mixture for preparing the final adhesive composition, but is preferably added to the reaction mixtures for preparing the prepolymer, so that such mixtures may be more easily mixed and handled. Suitable plasticizers and solvents are well-known in the art and include dioctyl phthalate, dibutyl phthalate, a partially hydrogenated terpene commercially available as "HB-40", trioctyl phosphate, epoxy plasticizers, toluene-sulfamide, chloroparaffins, adipic acid esters, castor oil, xylene, 1-methyl-2-pyrolidinone and toluene. The amount of plasticizer used is that amount sufficient to give the desired Theological properties and disperse the components in the adhesive composition. Preferably the plasticizer is present in an amount of about 0 percent by weight or greater based on the weight of the adhesive composition, more preferably about 5 percent by weight or greater and most preferably about 10 percent by weight or greater. The plasticizer is preferably present in an amount of about 45 percent by weight or less based on the weight of the adhesive composition, more preferably about 40 percent by weight or less and most preferably about 20 parts by weight or less.

The adhesive composition of this invention may be formulated by blending the components together using means well-known in the art. Generally the components are blended in a suitable mixer. Such blending is preferably conducted in an inert atmosphere and in the absence of atmospheric moisture to prevent premature reaction. It may be advantageous to add any plasticizers to the reaction mixture for preparing the isocyanate containing prepolymer so that such mixture may be easily mixed and handled. Alternatively, the plasticizers can be added during blending of all the components. Once the adhesive composition is formulated, it is packaged in a suitable container such that it is protected from atmospheric moisture. Contact with atmospheric moisture could result in premature cross-linking of the polyurethane prepolymer-containing isocyanate groups.

The clear primer composition is prepared by contacting the silanes and titanates in solvent and mixing to form a clear solution.

In general, the method of bonding glass, coated plastic or a window into a substrate comprises contacting the clear primer composition of the invention with the surface of the glass or coated plastic and allowing the solvent of the clear primer composition to volatilize away. Thereafter, a suitable adhesive is applied to the surface of the glass or coated plastic, along the portion of the glass or coated plastic which is to be bonded to the structure. The adhesive is thereafter contacted with the second substrate such that the adhesive is disposed between the glass and the second substrate. The adhesive is allowed to cure to form a durable bond between the glass or coated plastic and the substrate. In some embodiments, the glass or clear plastic has an opaque coating about the perimeter of the glass or clear plastic. This is commonly referred to as a frit. For glass the coating is an inorganic enamel. The clear primer improves the ability of the described adhesive systems to bond to such coatings.

The clear primer composition may be applied by any means well known in the art. It may be applied manually by brushing, rolling or applying a cloth containing the composition to the surface of a substrate to which the adhesive will be applied such that a sufficient amount of the primer composition is applied to the surface. Preferably, the clear primer composition is applied using a robot. Useful robots for this operation are for example is M710I, available from Fanuc Robotics America, of Rochester Hills, Mich. used with an automated primer dispense applicator supplied by Nordson Corporation, Amherst, Ohio. The primer is applied such that there is at least about 8 to about 15 seconds of dry time after priming. The adhesive is applied at least 20 seconds after application of the adhesive. The system of the invention can be used to bond glass or plastic coated with an abrasion resistant coating, to other substrates such as metal or plastics. The plastic coated with an abrasion resistant coating can be any plastic which is clear, such as polycarbonate, acrylics, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or plastic window has an opaque coating disposed in the region to be contacted with the adhesive to block UV light from reaching the adhesive.

In some embodiments, the adhesive composition is applied to the glass or coated plastic shortly after application of the clear primer composition. The minimum time between application of the clear primer and application of the adhesive is that time necessary for the solvent from the clear primer to volatilize away. In some embodiments, the clear primer adhesive composition may be applied in a different location from the location of application of the clear primer, for instance in a different part of the plant or a different plant. Further, the plants can be many miles apart, for instance hundreds or thousands of miles apart. The adhesive composition may be applied much later than the clear primer. In some embodiments, the time between application of the clear primer and application of the adhesive composition can be about 5 days or greater, or even 30 days or greater. The time period between application of the clear primer and the application of the adhesive composition can be about 90 days or less and preferably about 60 days or less.

One process for applying a primer to a window comprises the steps of:

(a) directing light onto the window to illuminate a portion of the window; (b) applying a primer along the illuminated portion of the window. If the clear primer contains a component that evaporates, then the process can further include the step of forming an infrared image of the window as the component evaporates to indicate the area of application of the clear primer. If the clear primer contains a component that fluoresces when illuminated by ultraviolet light, then the process can further include the step of illuminating the window with ultraviolet light to indicate the area of application of the clear primer. These processes may be performed as disclosed in commonly assigned Allam et al., U.S. Patent Publication 2003/0232152 and PCT Application WO03/106579, filed Jun. 11, 2003, incorporated herein by reference.

The system of the invention is used to bond porous and nonporous substrates together. The adhesive composition is applied to a substrate and the adhesive on the first substrate is thereafter contacted with a second substrate. Thereafter the adhesive is exposed to curing conditions. In a preferred embodiment one substrate is glass or coated plastic and the other substrate is a plastic, metal, fiberglass or composite substrate which may optionally be painted. This method is especially effective for substrates painted with an acid resistant paint. Generally the primers and adhesives are applied at ambient temperature in the presence of atmospheric moisture. Exposure to atmospheric moisture is sufficient to result in curing of the adhesive. Curing may be further accelerated by applying heat to the curing adhesive by means of convection heat, or microwave heating.

In reference to polyurethane prepolymers, average isocyanate functionality is determined according to Wu, U.S. Pat. No. 6,512,033 at column 11, lines 3 to 29 and Bhat, U.S. Pat. No. 5,922,809 at column 12, lines 65 to column 13, line 26, incorporated herein by reference.

Molecular weights as described herein are determined according to the following to the procedure disclosed in Bhat, U.S. Pat. No. 5,922,809 at column 12, lines 50 to 64, incorporated herein by reference.

SPECIFIC EMBODIMENTS OF INVENTION

The following examples are included for illustrative purposes only and are not intended to limit the scope of the invention. Unless otherwise stated, all parts and percentages are by weight.

Preparation of Clear Primers

The formulations are listed as either parts of the solution or as a percent based upon solids and are prepared by simply mixing the appropriate amounts of the desired material. The primer is prepared by adding a solvent to a pre-dried glass bottle. Each silane is added to the bottle and the bottle shaken for 2 minutes on a shaker. Finally, the titanate is added and the whole mixture is shaken for 3 minutes.

The adhesion experiments were performed on three ceramic enamels on the surface of a glass coupon. Two of these, a bismuth and zinc containing frit (Frit 1) and bismuth and zinc containing frit further containing lithium and sulfur (Frit 2), are used on press-bent glass. The third was a bismuth and zinc containing frit (Frit 3), which is used on sag-bent glass. Each of these three ceramic enamels is available from Ferro Corporation. All glass coupons were used as received without any additional cleaning or pretreatment other than the application of the indicated clear wipe.

The clear primer compositions were applied by saturating cheesecloth with the solution and applying a thin wet coating to the ceramic enamel surface. Twenty seconds after the application of the clear primer, the adhesive, was applied in a bead of 8 mm width and 6-8 mm thickness down the length of the substrate. The adhesive is allowed to cure for 7 days at 23° C. and 50 percent RH before testing. The adhesion test is a modified peel test called the Quick Knife Adhesion (QKA) test. In this test the adhesive/substrate interface is scored with a sharp knife as the adhesive is being pulled back. The results are listed as the percent of cohesive failure (failure within the urethane adhesive) with the desired result being 100 percent CF (cohesive failure). The alternative failure mode is adhesive failure which is failure of the bond of the adhesive to the surface of the substrate in addition to the initial adhesion results, additional samples were run through a durability experiment. After preparing the samples and curing for seven days as described above, the samples were placed into a water bath and held at 90° C. After the indicated times a sample was removed from the water bath, allowed to rest at least 15 minutes, and then tested via the QKA test. The long-term durability is expressed as the number of days required to lose 100 percent CF, i.e., the adhesive demonstrates some adhesive failure. Adhesive 1 is an adhesive formulated with a silane grafted isocyanate terminated prepolymer, plasticizer, carbon black, 2,2-dimorpholinodiethylether dimethyltin carboxylate and a phosphite antioxidant.

Table 1 lists the components used in the formulations of primers that meet the intended purpose of adhering to the ceramic enamel.

TABLE 1

Tyzor ® OGT titanate-octyleneglycol titanate = Tetrakis(2-ethyl-hexane'-1,3,diolato)titanate;
Tyzor ® TOT titanate-2-ethylhexyl titanate;
KR-TTS ® titanate-isopropyl triisostearoyl titanate;
KR ® 95 titanate-isopropyl tri(dodecyl)benzenesulfonyl titanate;
KR ® 44 titanate-isopropyl tri(N-ethylenediamino)ethyl titanate;
Tyzor ® NBZ zirconate-N-butyl zirconate;
Tyzor ® NBZ zirconate-triethanolamine zirconate;
Mercaptosilane is mercaptopropyltrimethoxysilane.
Polyaminosilane is N-2-aminoethyl-3-aminopropyltrimethoxy-silane.
Secondary amino silane is bis(trimethyloxysilylpropyl)amine.
Ethyl triacetoxy silane Table 2 gives the formulations of Examples 1-12. Examples 1-12 illustrate the types of titanates or zirconates used in conjunction with the mixture of silanes used. The table gives the relative amounts of the reactive materials as a function of total formulation solids. Examples 13 and 14 give the performance of primers that were made without silane adhesion promoters. Adhesive 1 was applied to each of the examples 20 seconds after the clear wipe was applied to the glass and the results indicate that the adhesion is greatly improved by the combination of silane mix and the titanium compound. A comparison of after the clear wipe was applied to the glass and the results indicate that the adhesion is greatly improved by the combination of silane mix and the titanium compound. A comparison of Examples 10, 13 and 14 show the benefits of the titanate/silane combination. The adhesion of Example 10, a combination of Tyzor® TOT and the silane mix demonstrates 100 percent CF. Removal of the silane mix decreases performance of the adhesive to 60 percent CF for Example 13 and to less than 90 percent CF for Example 14. The replacement of the titanium compound with a zirconium compound also decreases the adhesion. The two formulations made with zirconium compounds, Examples 11 and 12, failed with 100 percent adhesive failure in the initial QKA tests. Adhesive Failure (AF) means the adhesion of the adhesive to the surface of the substrate fails.

TABLE 2

Initial Adhesion: effect of titanate or zirconate

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Toluene | 73.1 | 74.7 | 75.4 | 71.5 | 69.9 | 69.9 | 75.4 | 74 | 74 | 73.0 | 73.1 | 73.1 | 74.0 | 74.0 |
| Mercaptosilane | 1.0 | 1.0 | 1.0 | 1.0 | 1.0 | 1.0 | 1.0 | 1.0 | 1.0 | 1.0 | 1.0 | 1.0 |  |  |
| Polyaminosilane | 1.0 | 1.0 | 1.0 | 1.0 | 1.0 | 1.0 | 1.0 | 1.0 | 1.0 | 1.0 | 1.0 | 1.0 |  |  |
| Secondary Aminosilane | 1.0 | 1.0 | 1.0 | 1.0 | 1.0 | 1.0 | 1.0 | 1.0 | 1.0 | 1.0 | 1.0 | 1.0 |  |  |

TABLE 2-continued

Initial Adhesion: effect of titanate or zirconate

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Tyzor ® OGT Titanate | 3.9 | 2.3 | 1.6 | 5.5 | 7.1 | | | | | | | | | |
| Kenreact KR-TTS Titanate | | | | | | 7.1 | 1.6 | | | | | | | |
| Tyzor ® TOT Titanate | | | | | | | | | | 4.0 | | | 6.0 | 3.0 |
| Kenreact KR-09S Titanate | | | | | | | | 3.0 | | | | | | |
| Kenreact KR-44s Titanate | | | | | | | | | 3.0 | | | | | 3.0 |
| Tyzor NBZ Zirconate | | | | | | | | | | | 3.9 | | | |
| Tyzor EAZ Zirconate | | | | | | | | | | | | 3.9 | | |
| Total parts by weight | 80 | 80 | 80 | 80 | 80 | 80 | 80 | 80 | 80 | 80 | 80 | 80 | 80 | 80 |

Quick Knife Adhesion Results (20 sec open time), 7 day cure at 23° C./450 percent RH)

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Frit 3 | 100 cf | 100 cf | 100 cf | 100 cf | 100 cf | 100 cf | 100 cf | 100 cf | 100 cf | 100 cf | 0 cf | 0 cf | 60 cf | 80 cf |
| Frit 1 | 100 cf | 100 cf | 100 cf | 100 cf | 100 cf | 100 cf | 100 cf | 100 cf | 100 cf | 100 cf | 0 cf | 0 cf | 60 cf | 90 cf |
| Frit 2 | 100 cf | 100 cf | 100 cf | 100 cf | 100 cf | 100 cf | 100 cf | 100 cf | 100 cf | 100 cf | 100 cf | 0 cf | 60 cf | 80 cf |

The combination of Tyzor® OGT and silanes was further investigated to determine the effects of changing the silane mix ratio and the amount of titanate relative to the amount of silane. Table 3 lists the formulations of an additional 12 examples (numbers 15-27). In addition to the initial QKA results, the durability performance, as measured by the number of days in 90° C. water before there is a loss of adhesion is also listed for each example.

The combination of an organotitanate with the silane mix demonstrates excellent adhesion. A comparison of Examples 1, 2, 3 and 24 show the durability improvements when Tyzor® OGT is used with a 1:1:1 mix of silanes. When Tyzor® OGT Titanate removed from the formulation, there is a complete loss of cohesive failure to each of the three frits in less than one day in the water bath. Tyzor® OGT Titanate, regardless of the level used, improves the adhesion durability

TABLE 3

| | 15 | 16 | 17 | 18 | 19 | 20 | 1 | 2 | 3 | 21 | 22 | 23 | 24 |
|---|---|---|---|---|---|---|---|---|---|---|---|---|---|
| Toluene | 73.1 | 73.4 | 74 | 73.1 | 74.1 | 73.3 | 73.1 | 74.7 | 75.4 | 73.1 | 71.5 | 73.1 | 77 |
| Mercaptosilane | 1.6 | 2.4 | 3.3 | 2.4 | 3.3 | 3.3 | 1 | 1 | 1 | 1.6 | 3.3 | 3.3 | 1 |
| Polyaminosilane | 0.9 | 0.8 | 0.4 | 0.3 | 0.3 | 0.2 | 1 | 1 | 1 | 10.9 | 3.3 | 0.4 | 1 |
| Secondary Aminosilane Ethyl triacetoxy silane | 0.8 | 01.2 | 0.2 | 1.2 | 0.3 | 0.4 | 1 | 1 | 1 | 0.8 | 1.2 | 0.2 | 1 |
| Tyzor ® OGT Titanate | 3.7 | 3.2 | 2 | 3 | 2 | 3 | 3.9 | 2.3 | 1.6 | 3.7 | 4 | 3 | 0 |
| Total | 80 | 80 | 80 | 80 | 80 | 80.2 | 80 | 80 | 80 | 80 | 80 | 80 | 80 |
| Solid % | | | | | | | | | | | | | |
| Mercaptosilane | 22.8 | 36.4 | 55.6 | 34.8 | 55.6 | 47.6 | 14.5 | 18.9 | 21.7 | 22.8 | 38.7 | 47.6 | 33.3 |
| Polyaminosilane | 12.4 | 12.1 | 7.0 | 4.3 | 5.3 | 3.0 | 14.5 | 18.9 | 21.7 | 12.4 | | 5.9 | 33.3 |
| Secondary Aminosilane Ethyl triacetoxy silane | 11.6 | 3.0 | 3.5 | 17.4 | 5.3 | 5.9 | 14.5 | 18.9 | 21.7 | 11.6 | 14.1 | 3.0 | 33.3 |
| Tyzor ® OGT Titanate | 53.3 | 48.5 | 33.9 | 43.5 | 33.9 | 43.5 | 56.5 | 43.4 | 34.8 | 53.3 | 47.1 | 43.5 | |
| Total | 100.0 | 100.0 | 100.0 | 100.0 | 100.0 | 100.0 | 100.0 | 100.0 | 100.0 | 100.0 | 100.0 | 100.0 | 100.0 |
| Initial QKA Results | | | | | | | | | | | | | |
| Frit 3 | 100 cf | 100 cf | 100 cf | 100 cf | 100 cf | 100 cf | 100 cf | 100 cf | 100 cf | 100 cf | 100 cf | 100 cf | 100 cf |
| Frit 2 | 100 cf | 100 cf | 100 cf | 100 cf | 100 cf | 100 cf | 100 cf | 100 cf | 100 cf | 100 cf | 100 cf | 100 cf | 100 cf |
| CF Days @90° C., water | | | | | | | | | | | | | |
| Frit 3 | >16 | >9 | >17 | >11 | >17 | >14 | >10 | 9 | >10 | >16 | >14 | >11 | <1 |
| Frit 1 | 6 | 5 | 7 | 3 | 2 | 7 | 2 | 4 | 1 | 6 | 5 | >10 | <1 |
| Frit 2 | 3 | 5 | 8 | 3 | 4 | 3 | 3 | 0 | 0 | 3 | 0 | 8 | <1 |

Examples 1-3 and 15-23, which are comprised of the mercaptopropyl trimethoxy silane, N-aminoethyl-3-aminopropyl trimethoxy silane, and bis-(3-trimethoxysilylpropyl) amine silanes combined with Tyzor® OGT, Titanate exhibited 100 percent cohesive failure in the initial adhesion experiments. Example 24, made without Tyzor® OGT Titanate and with a 1:1:1 mix of the silanes achieved strong initial adhesion to each of the three enamels. However, the durability of this system is less than desirable.

for each of the ceramic enamels. Durability performance is obtained when there is a higher percentage of mercaptosilane in the formulation. This is illustrated through a comparison of Examples 18, 20 and 23. The durability is improved when the amount of amino silane is reduced relative to the mercaptosilane.

Two adhesive systems were compared, one without a stabilizer package and one with a stabilizer package. The first adhesive was adhesive 1 as described hereinbefore. The second adhesive contained was adhesive 1 with a hindered amine light stabilizer sold under the trademark and designation Tinuvin 765 and an ultraviolet light absorber of Tinuvin 571. A primer comprising the primer of Example 17 was applied by wiping it on the enamel coated glass substrate surface using a cheesecloth soaked with the primer. The subtrates used were Frits 1 to 3. The solvent was allowed to flash off for 20 seconds and the adhesives were applied. The adhesive was cured at 23° C. at 50 percent relative humidity for 7 days. Samples were subjected to conditions as described in SAE 1885 in a WOM (weatherometer) for 2000 and 2500 hours then the samples were tested according test SAE 1885. The results are compiled in Table 4.

adhesive based on isocyanate and silane functional prepolymer. Adhesive B is an adhesive based on an isocyanate functional prepolymer.

The results of the testing are contained in Table 5. Open time is the time between application of the clear primer and adhesive. Initial means testing of a coupon after 7 day cure of the adhesive on the coupon. Humidity means testing of the adhesive bond to the coupon after 7 day cure and the 14 day exposure to 100° C. and 100 percent humidity. The data in Table 5 demonstrates that the open time between application of the clear primer and the adhesive can be from 0 to 90 days and a good bond of adhesive to the glass coupon is formed.

TABLE 4

| | Adhesive | | | | | |
|---|---|---|---|---|---|---|
| | 1 | 1 | 1 | 2 | | 2 |
| | | | | Frit | | |
| | 3 | 1 | 2 | 3 | 1 | 2 |
| 2000 hrs, | | | | | | |
| 1 | 502/100CF | 553/100CF | 509/100CF | 584/70CF30AF | 493/100CF | 538/100CF |
| 2 | 507/100CF | 633/100CF | 578/100CF | 484/20CF 80AF | 657/100CF | 579/100CF |
| 3 | 530/100CF | 814/100CF | 361/50CF 50AF | 517/100CF | 538/100CF | 558/100CF |
| 4 | 453/100CF | 401/80CF20AF | 494/60CF40AF | 472/100CF | 673/100CF | 525/100CF |
| 5 | 446/100CF | 515/100CF | 444/100CF | 532/100CF | 585/100CF | 490/100CF |
| 6 | 560/100CF | 417/95CF | 471/100CF | 460/100CF | 554/100CF | 653/100CF |
| Avg. | 500 | 556 | 476 | 508 | 583 | 557 |
| 2500 hrs, | | | | | | |
| 1 | 497/100CF | 637/70CF 30AF | 100AF | 538/100CF | 484/100CF | 501/100CF |
| 2 | 539/100CF | 521/100CF | 100AF | 528/100CF | 486/100CF | 489/100CF |
| 3 | 596/100CF | 542/90CF 10AF | 100AF | 515/100CF | 609/100CF | 478/100CF |
| 4 | 553/80CF 20AF | 484/100CF | 500/100CF | 548/100CF | 513/100CF | 459/100CF |
| 5 | 527/80CF 20AF | 491/100CF | 456/100CF | 546/100CF | 484/100CF | 398/100CF |
| 6 | 504/90CF 10AF | 389/20CF80AF | 805/100CF | 528/100CF | 557/100CF | 506/100CF |
| Avg. | 536 | 511 | 587 | 534 | 522 | 472 |

This data illustrates that the use of a light and a UV stabilizer in an adhesive improves the long term durability of the adhesive system bond.

Open Time Testing

The primer of Example 23 was applied to glass coupons coated with Frit 1 enamel. The coupons were stored at 35° C. in 90 percent relative humidity for the time stated. Adhesives A and B were applied to the coupons according to the QKA test described above. The coupons with adhesive applied to the surface were then cured for 7 days at 23° C. and 50 percent relative humidity. For each open time period, one coupon was tested according to the QKA after the initial curing period. A second coupon was subjected, stored for 14 additional days at 100° C. and 100 percent humidity. Adhesive A is an

TABLE 5

| Adhesive | Open Time | Condition | Mode of Failure |
|---|---|---|---|
| A | 0 Day | Initial | 100% CF |
| | | Humidity | 100% CF |
| | 7 Days | Initial | 100% CF |
| | | Humidity | 100% CF |
| | 14 Days | Initial | 100% CF |
| | | Humidity | 100% CF |
| | 21 Days | Initial | 100% CF |
| | | Humidity | 100% CF |
| | 30 Days | Initial | 100% CF |
| | | Humidity | 100% CF |
| | 45 Days | Initial | 100% CF |
| | | Humidity | 100% CF |

TABLE 5-continued

| Adhesive | Open Time | Condition | Mode of Failure |
|---|---|---|---|
| | 60 Days | Initial | 100% CF |
| | | Humidity | 100% CF |
| | 90 Days | Initial | 100% CF |
| | | Humidity | 100% CF |
| B | 0 Day | Initial | 100% CF |
| | | Humidity | 100% CF |
| | 7 Days | Initial | 100% CF |
| | | Humidity | 100% CF |
| | 14 Days | Initial | 100% CF |
| | | Humidity | 100% CF |
| | 21 Days | Initial | 100% CF |
| | | Humidity | 100% CF |
| | 30 Days | Initial | 100% CF |
| | | Humidity | 100% CF |
| | 45 Days | Initial | 100% CF |
| | | Humidity | 100% CF |
| | 60 Days | Initial | 100% CF |
| | | Humidity | 100% CF |
| | 90 Days | Initial | 100% CF |
| | | Humidity | 100% CF |

What is claimed is:

1. A composition comprising
   a) one or more organotitanates or organozirconates having four ligands wherein the ligands are hydrocarbyl, optionally containing one or more functional groups having one or more heteroatoms selected from the group comprising oxygen, nitrogen, phosphorus and sulfur wherein two or more of the ligands may form a cyclic structure;
   b) one or more mercaptosilanes;
   c) one or more polyaminosilanes;
   d) one or more secondary aminosilanes; and
   e) one or more solvents which dissolve the components of the composition.

2. A composition according to claim 1 wherein the ligands on the titanate are hydrocarbyl, hydrocarbyl carboxyl, hydrocarbyl sulfonyl, hydrocarbyl amino, phosphato hydrocarbyl, pyrophosphato hydrocarbyl, two or more ligands form a hydrocarbylene moiety, two or more ligands form a carboxyl containing hydrocarbylene moiety or a mixture thereof.

3. A composition according to claim 1 wherein the organotitanate or organozirconate corresponds to the formula $M(—OR^1)_4$ wherein M is Ti or Zr, $R^1$ is independently in each occurrence hydrocarbyl, hydrocarbyl carboxyl, hydrocarbyl sulfonyl, hydrocarbyl amino, phosphato hydrocarbyl, pyrophosphato hydrocarbyl, with the proviso that two or more of $R^1$ may combine to form a cyclic ring structure.

4. A composition according to claim 1 which comprises:
   a) from about 0.08 to about 45 percent by weight of one or more organotitanates or organozirconates;
   b) from about 0.03 to about 59 percent by weight of one or more mercapto-silanes;
   c) from about 0.005 to about 16 percent by weight of one or more polyaminosilanes;
   d) from about 0.01 to about 16 percent by weight of one or more secondary aminosilanes; and
   e) from about 30 to about 99.5 percent by weight of one or more solvents wherein the weight percents stated are based on the weight of the total composition.

5. The composition according to claim 4 wherein the weight ratio of b) one or more mercaptosilanes to c) one or more polyaminosilanes to d) one or more secondary aminosilanes is from about 10:1.0:0.40 to about 1.0:1.0:1.0.

6. A system for bonding glass to a substrate which comprises:
   i) a composition according to claim 1; and
   ii) an adhesive comprising an isocyanate functional prepolymer and a catalyst for the cure of the isocyanate functional prepolymer.

7. A system according to claim 6 wherein the composition (i), the adhesive composition (ii) or both further comprises an ultraviolet light stabilizer.

8. A system according to claim 6 wherein the composition (i), the adhesive composition (ii) or both further comprises a hindered amine light stabilizer.

9. A system according to claim 6 wherein the composition (i), the adhesive composition (ii) or both further comprises a stabilizing amount of an organophosphate which has an alkaryl ligand or both an aliphatic ligand and an aromatic ligand.

10. A system according to claim 6 wherein the composition (i), the adhesive composition (ii) or both further comprises a stabilizing amount of an organophosphate which has an alkaryl ligand or both an aliphatic ligand and an aromatic ligand, an ultraviolet light stabilizer, and a hindered amine light stabilizer.

11. An automobile wherein the adhesive system holding one of the windows into the automobile is the system of claim 6.

12. A method comprising:
   A) applying a composition according to claim 1 to the surface of glass or plastic substrate coated with an abrasion resistant coating along the portion of the glass or coated plastic substrate to be bonded into a structure;
   B) applying a polyisocyante functional adhesive composition to the surface of the glass or coated plastic substrate along the portion to be bonded into the structure to which the composition of claim 1 was previously applied; and
   C) contacting the glass or coated plastic substrate with the structure with the adhesive disposed between the glass or coated plastic substrate and the structure.

13. A method according to claim 12 wherein the ligands on the titanate are hydrocarbyl, hydrocarbyl carboxyl, hydrocarbyl sulfonyl, hydrocarbyl amino, phosphato hydrocarbyl, pyrophosphato hydrocarbyl, two or more ligands form a hydrocarbylene moiety, two or more ligands form a carbonyl containing hydrocarbylene moiety or a mixture thereof.

14. A method according to claim 13 wherein the organotitanate corresponds to the formula $M(—OR^1)_4$ wherein M is Ti or Zi, $R^1$ is independently in each occurrence hydrocarbyl, hydrocarbyl carboxyl, hydrocarbyl sulfonyl, hydrocarbyl amino, phosphato hydrocarbyl, or pyrophosphato hydrocarbyl, with the proviso that two or more of $R^1$ may combine to form a cyclic ring structure.

15. A method according to claim 13 wherein the composition applied in step A comprises:
   a) from about 0.08 to about 45 percent by weight of one or more organotitanates;
   b) from about 0.03 to about 59 percent by weight of one or more mercaptosilanes;
   c) from about 0.005 to about 16 percent by weight of one or more polyaminosilanes;
   d) from about 0.01 to about 16 percent by weight of one or more secondary aminosilanes; and
   e) from about 30 to about 99.5 percent by weight of one or more solvents;
   wherein the weight percentages stated are based on the weight of the total composition.

16. A method according to claim 15 wherein the weight ratio of b) one or more mercaptosilanes to c) one or more polyaminosilanes and d) one or more secondary aminosilanes is from about 10:1.0:0.40 to about 1.0:1.0:1.0.

17. A method according to claim 16 wherein the structure is an automobile.

18. A method according to claim 15 wherein the composition applied in Step A) or the adhesive applied in Step B) further comprises an ultraviolet light stabilizer.

19. A method according to claim 15 wherein the composition applied in Step A) or the adhesive applied in Step B) further comprises a hindered amine light stabilizer.

20. An automobile wherein at least one of the windows of the automobile is bonded in using the method of claim 12.

21. A method of bonding a window into a vehicle which comprises:

A) contacting a composition according to claim 1 with the portion of the window into the vehicle;
B) after about 5 days to about 90 days applying a polyisocyanate functional adhesive composition to the surface of the glass or plastic window along with portion of the glass or plastic window to be bonded to the structure to which the composition of claim 1 was previously applied; and
C) contacting the window with the structure with the adhesive disposed between the window and the structure.

* * * * *